US008141515B2

(12) United States Patent
Nien

(10) Patent No.: US 8,141,515 B2
(45) Date of Patent: Mar. 27, 2012

(54) METHOD OF AQUACULTURE

(76) Inventor: Te-Chih Nien, Changhua (TW)

( * ) Notice: Subject to any disclaimer, the term of this patent is extended or adjusted under 35 U.S.C. 154(b) by 96 days.

(21) Appl. No.: 12/756,203

(22) Filed: Apr. 8, 2010

(65) Prior Publication Data
US 2010/0269761 A1 Oct. 28, 2010

(30) Foreign Application Priority Data
Apr. 22, 2009 (TW) .............................. 98113353 A

(51) Int. Cl.
A01K 61/00 (2006.01)
A01K 63/04 (2006.01)
(52) U.S. Cl. ........................................ 119/226; 119/259
(58) Field of Classification Search .................. 119/200, 119/207, 209, 227, 259–263, 211, 215, 216, 119/225, 226
See application file for complete search history.

(56) References Cited

U.S. PATENT DOCUMENTS

| 3,198,171 A * | 8/1965 | Westphal ...................... 119/200 |
| 3,929,101 A * | 12/1975 | Katz ............................ 119/260 |
| 4,043,299 A * | 8/1977 | Birkbeck et al. .............. 119/227 |
| 4,052,960 A * | 10/1977 | Birkbeck et al. .............. 119/227 |
| 4,368,691 A * | 1/1983 | Brune ........................... 119/207 |
| 4,846,107 A * | 7/1989 | Fenske et al. ................. 119/226 |
| 5,038,715 A * | 8/1991 | Fahs, II ........................ 119/224 |
| 5,174,239 A * | 12/1992 | Sato ............................. 119/249 |
| 5,294,335 A * | 3/1994 | Chiang ...................... 210/167.21 |
| 5,732,657 A * | 3/1998 | Idbeis ........................... 119/257 |
| 5,961,831 A * | 10/1999 | Lee et al. ...................... 210/614 |
| 6,382,134 B1 * | 5/2002 | Gruenberg et al. ........... 119/215 |
| 6,432,312 B1 * | 8/2002 | Fuss ............................. 210/668 |
| 2009/0159010 A1 * | 6/2009 | Spartz .......................... 119/200 |

FOREIGN PATENT DOCUMENTS
GB 2241420 A * 9/1991
JP 09000109 A * 1/1997

OTHER PUBLICATIONS
Machine translation of JP 09000109, Nojiri et al., published Jan. 7, 1997.*

* cited by examiner

Primary Examiner — Rob Swiatek
Assistant Examiner — Kathleen Iwasaki
(74) Attorney, Agent, or Firm — Leong C. Lei

(57) ABSTRACT

A method of aquaculture is applicable to a novel culture arrangement for diversified farming of generally deep sea fin fishes, shrimps, and shellfishes. A pre-manufactured enclosed cultivation tank is provided and air compressor facility is included for pressurization and oxygenation so as to make the interior of the cultivation tank a pressurized water environment of predetermined high pressure. A low pressure siphon tube is included for sucking and removing excrements from the cultivation tank and to realize water replacement in a natural manner thereby providing a deep sea mimicked clean cultivation environment. The drained water is subjected to multiple steps of filtration and purification for separating the excrements from the water and for purifying water to allow cyclic use of the water. An arrangement of multiple cultivation tanks allows for diversified and multi-species cultivation of fishery products and deep sea fishes.

3 Claims, 3 Drawing Sheets

METHOD OF AQUACULTURE

TECHNICAL FIELD OF THE INVENTION

The present invention generally relates to a novel method of aquaculture, and more particularly to a method for farming deep sea fishes through an enclosed tank and application of pressurization to provide a high pressure environment for deep sea culture and ensure a deep sea mimicking secured cultivation environment and providing secured and purified cultivation water through the application of multi-step filtration and purification devices so as to establish a culture environment in the cultivation tank that mimics the deep sea environment and realize cultivation operation for artificial deep sea aqua-farming, ensuring stable supply of deep sea fishery products and safety and hygiene of food consuming.

DESCRIPTION OF THE PRIOR ART

The supply and consuming of the traditional deep sea fishes is realized by sending large-sized fishing boats to the oceans and seas for fish catching. Such a travel often takes months and the fishery catches, although being kept fresh through freezing, may still take quite some time to reach the dinning tables, making the taste and food hygiene poor and deteriorated. Such frozen fishes are not comparable to live fishes in respect of the tastes. Due to the unique living environments of the deep sea fishes, farming and mass production of the deep sea fishes are almost impossible. This is simply because the deep sea high pressure environment is hard to mimic on the ground. For the updated cultivation technology and fishery, the most commonly known is fresh water farming and shallow sea farming and there is no deep sea water cultivation technology available. Further, the updated aquaculture technology is realized by forming a dam or pond and the fish species that can be farmed in this way are only limited to inshore or shallow water fishes, shrimps, or shellfishes and it is impossible to perform diversified or multi-species and high economic value cultivation. Thus, it is still a challenge for the fish culture industry to develop deep sea aquaculture for providing fishery product that makes economic values and is feasible in producing fishery products that can be stably supplied and shows excellent food hygiene.

SUMMARY OF THE INVENTION

In view of the conventional aquaculture being impossible to increase the fishery production of high economic value, the present invention aims to provide a method of aquaculture that includes a unique high pressure pressurization device that pressurizes a cultivation tank for mimicking a deep sea environment for farming fishes therein and that provide unique water circulation and flowing at the bottom of the cultivation tank to simply discharging cultivation wastes through multi-step of filtration and purification to separate water and excrements thereby allowing the water to be cyclically used so as to overcome the troubles and problems occurring in deep sea aquaculture.

An objective of the present invention is to provide a pre-manufactured cultivation tank that is combined with a complete set of pressurization facility to simply build up a deep sea cultivation environment in the cultivation tank and further added with multi-step filtration and purification to separate water and excrements of the cultivated species for cyclic use and secured and safety cultivation. Through selective combination of multiple sets of cultivation tanks, simply diversified culture of various species of fishes can be done to ensure the stable supply of high economic value fishery products and significantly reduce overall cultivation costs, thereby realizing the industrial use and value of standardization of cultivation technology and also ensuring food hygiene and quality of cultivation.

Another objective of the present invention is to provide a complete set of aquaculture system through an arrangement of pre-manufactured cultivation tanks in an indoor space in order to realize unique packaged management, which also provides the value for sight-seeing for tourists and easy and standardized management through computer control, whereby the cultivation technology can be scientific and innovated to truly meet the needs of economic value of development.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
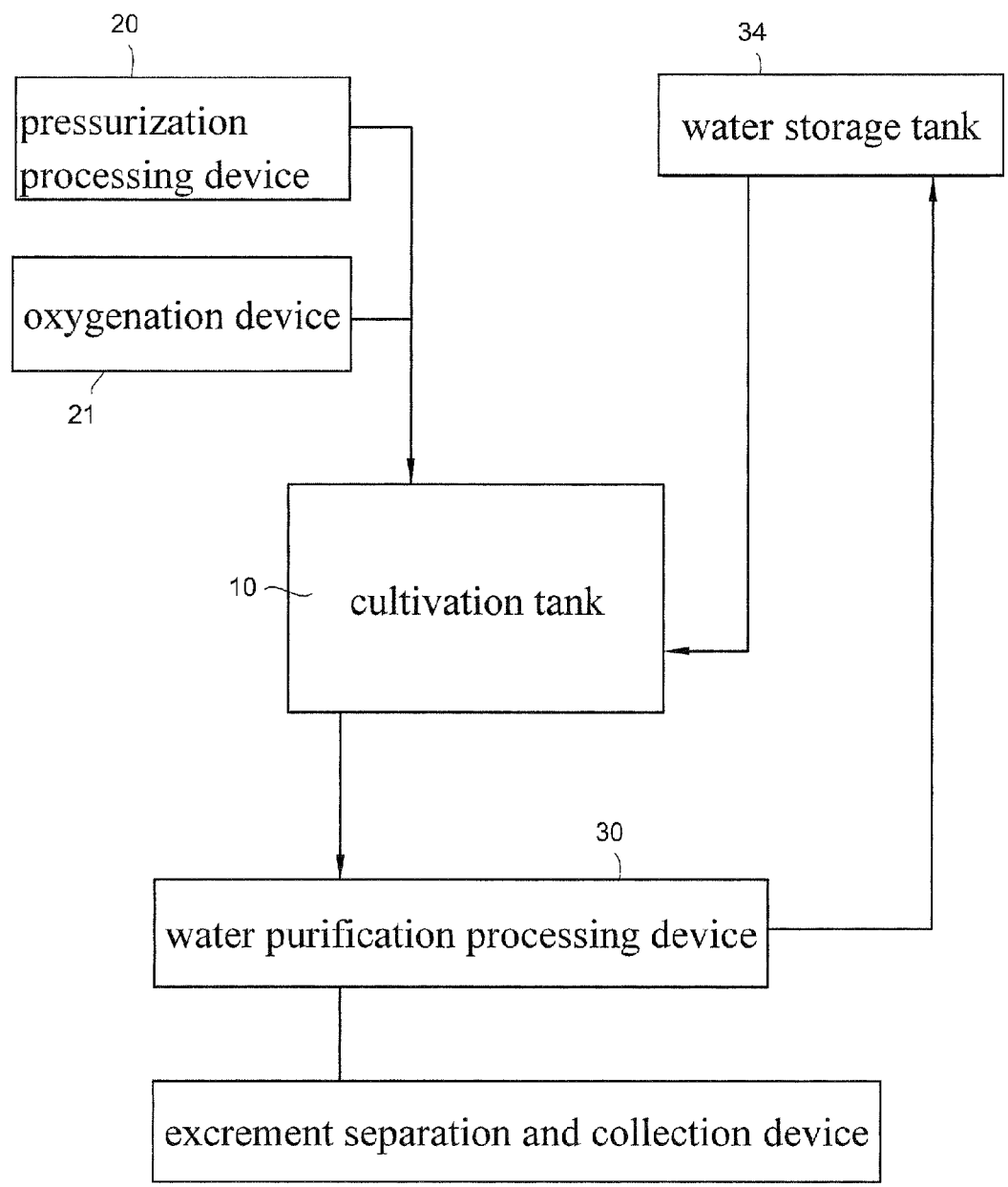
FIG. 1 is a flow chart of a method of aquaculture according to the present invention.
Figure 2:
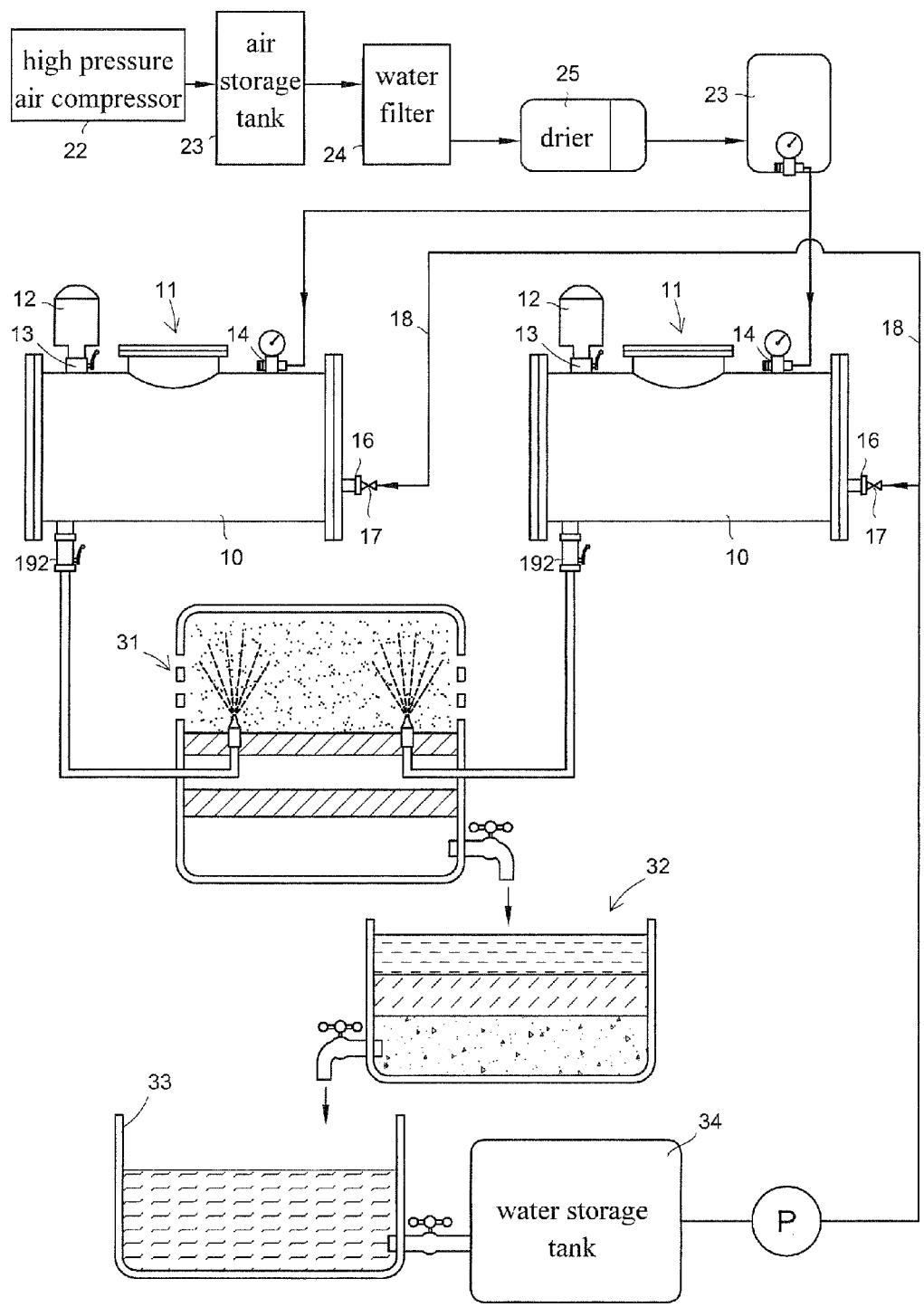
FIG. 2 is a schematic view showing an arrangement of an aquaculture system according to the present invention.
Figure 3:
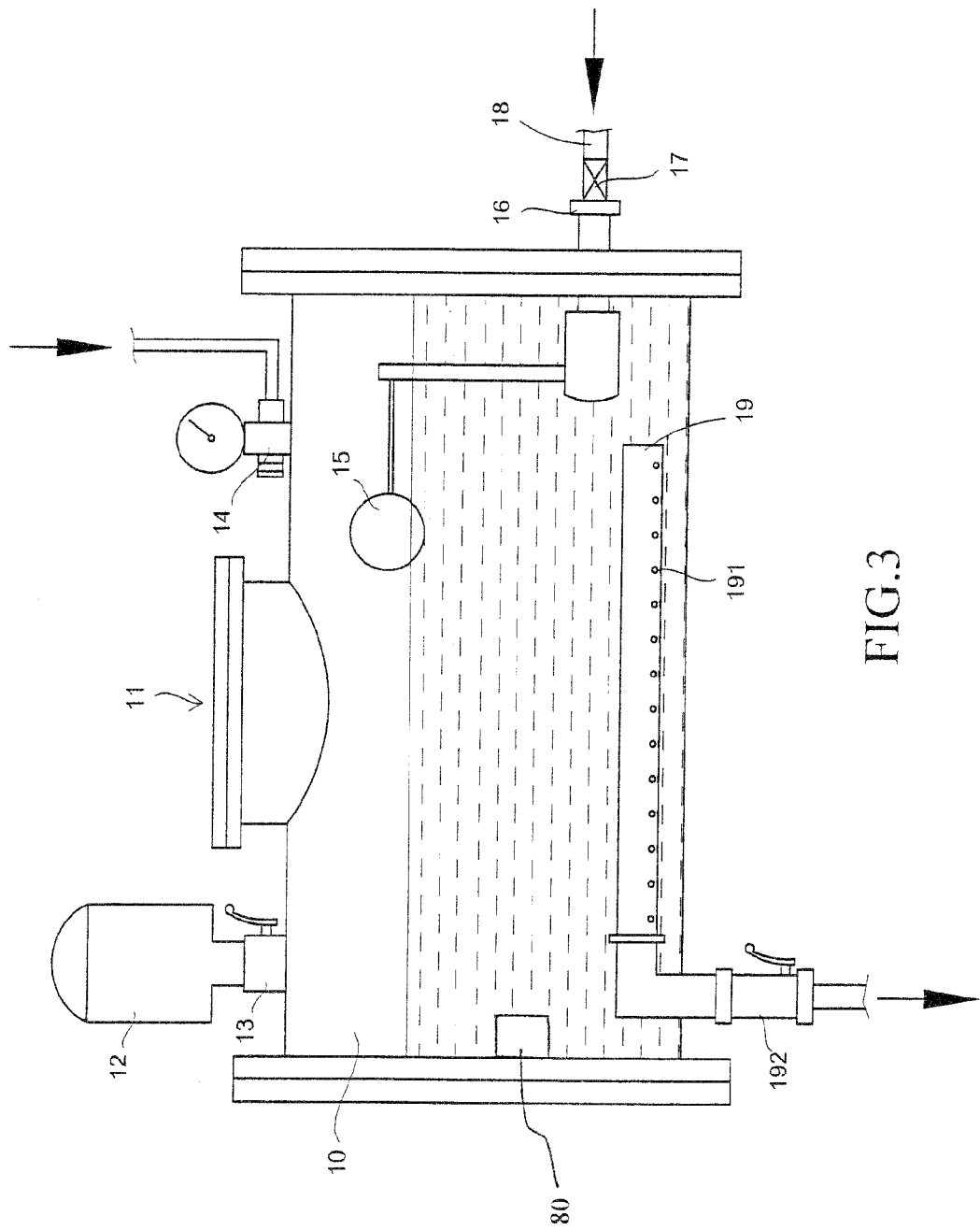
FIG. 3 is a schematic view showing an embodiment of a cultivation tank according to the present invention.

The present invention provides a novel method of aquaculture, which is method that facilitates multi-species aqua-farming for fin fishes, shrimps, shellfishes, and the likes and allows for farming of deep-sea high-pressure fin fishes of high economic value. The arrangement for aquaculture according to the present invention is illustrated in FIGS. 1-3, wherein a pre-manufactured cultivation tank 10 or a container is provided as a main equipment of aquaculture. A pressurization processing device 20 is included for supplying pressurized and purified air. An oxygenation device 21 is also included for directly supplying oxygen into a pressurized air conduit or a water storage tank 34 in order to pressurize the interior of the cultivation tank 10 and properly replenish oxygen contained water. After-cultivation water draining from the cultivation tank 10 is discharged through a siphon cross-flow fashion to thereby enhance cross flowing of the cultivation water. The drained water is processed by a water purification processing device 30 for separation and collection of impurities and excrements contained in the water with an excrement separation and collection device 35, so as to purify the water and conducts the water so purified to the water storage tank 34 for circulatory use, thereby forming a complete aquaculture system.

The cultivation tank 10 is constructed according to the sizes and quantities of the farmed fin fishes, shrimps, or shellfishes and can be of different volumes and outer configurations and shapes, or can alternatively be arranged to combine a number of cultivation tanks together to allow for simultaneous farming of different species of fish to achieve an economic scale of practical aquaculture. To facilitate management of the aquaculture system, a complete set of aquaculture system can be set up indoors to apply workshop like management, where the cultivation tank 10 can be an enclosed container to allow for easy pressurization operation by using a complete set of externally installed pressurization processing device 20, which generally comprises a major pressurization equipment constituted by a high pressure air compressor 22 that supplies pressurized air that is accumulated in an air storage tank 23 and is subjected to processing by a water filtration 24 for water filtration and a drier 25 so as to effectively remove water and oil contained in the pressurized air and thus provide purified pressurized air. The pressure setting of the pressurization facility can be determined according to practical needs for cultivation, or depending upon the water depth desired for fishery. For regular air compressor devices, the requirement for fish farming at water depth of 250 meters, which is around 26 kg/m, can be met, in order to supply pressurized air and oxygen for carrying out oxygenation processing 21 and realizing internal pressurization of the cultivation tank 10. According to the needs for practical pressurization and entry and removal of fishes, the cultivation tank, as a whole, can be of a configuration of elongate barrel or unique conduit or chamber, which, besides forming a large entry opening 11 for deposition of fishes into the tank or catch of the fishes with a net, is provided, at a side portion thereof, a bait feeding opening for installation of a bait feeder 12, which includes a closing valve 13 for simple sealed bait feeding control that realizes easy and secured bait feeding and stabilization of pressure. Also provided is a pressurization air entry opening to which a pressure regulation valve set 14 is mounted for timely supply and mixture of properly pressurized and clean gas from the pressurization processing. At one side of the interior space of the cultivation tank, a liquid level control switch 15 is provided for controlling the opening and closing of a water inlet port 16 so as to maintain stable water level. Arranged outside the water inlet port 16 is a control valve 17 that is connected to a water inlet tube 18 to supply purified and oxygenated water, which has been processed for purification and oxygenation, into the tank for circulation and replenishment of cultivation water. At one side of the interior of the tank, a wave generation device 80 is provided for forming wave in the water contained in the tank. The tank has a bottom that has a recessed curved configuration to allow for installation of a siphon tube 19 at a predetermined height above an upper edge of the curved bottom surface, which functions for water draining and projects outside the tank and has an in-tank tube portion that forms a hollowed surface 191 and a portion of the tube that extends outside the tank being provided with a control valve 192, which after opened, establishes a negative pressure siphon effect through a high pressure inside the tank and a low pressure outside the tank for sucking and discharging fish excrements settled on the bottom with draining water flow so as to ensure fresh and stable water quality inside the tank. Through the internally mounted water level control switch 15 controlling water in-feeding supply, freshness of water inside the cultivation tank 10 and natural replacement and flowing of water of the tank can be realized.

The drained water that is discharged outside the cultivation tank is directly conducted to a water purification processing device 30 for stepwise aeration and filtering/purification. First of all, the water is conveyed into the first-step aeration/separation tank 31, of which an upper half forms a natural aeration chamber, whereby when the drained water is sent into the upper half of the tank, the drained water is jetted into the tank through application of negative pressure to effect natural aeration and then flows through internally arranged multi-step cotton filter layers for preliminary purification/filtration that separates water and excrements, so that water and excrements can be initially separated and purified/filtered. The preliminarily separated/purified water is guided into a second-step filtering/purification tank 32 to be subjected to filtering and purification by various filtering materials in individual layers, wherein through stepwise filtrations realized through the application of denser cotton filter screen, sands, and fine aggregates, the water is relatively purified. For the purposes of filtration and purification, the purification process is made a filtration process through multi-step arrangement that, if desired, can be expanded or contracted so as to make the purification of water fit for the use of aqua-farming. The filtered and purified water is guided into an ecological pond 33 for collection and purification, so that the water is subjected to further purification for carbon removal and filtration and purification for harmful substances through the application of an ecological process with for example seaweeds or the likes. The water is then collected in the water storage tank 34 for circulation and re-uses so as to serve as replenishment for water for the aquaculture. The whole aquaculture arrangement completely meets the needs of environmental conversation. Further, computer control is further applied to realize programmed aquaculture. Thus, the method of aquaculture according to the present invention allows for scientific standardization of aquaculture of deep sea fishes and is apparently an innovation of aqua-farming method.

With the arrangement of a complete and stable control of a high pressures generation device that realizes pressurization and through the modern computer based control, the needs for automatized, stable, and secured pressurization can be met, and further cooperated with the arrangement of the pre-manufactured cultivation tank 10 that provides control for pressure-regulated aquaculture, aqua-farming environments of different depths of water can be built up by properly adjusting and converting the pressure. The aqua-farming conditions can be regulated, controlled, and converted through scientific technology to build up various different aqua-farming environments for farming different species of fishes. In particular, the tank-based farming arrangement allows for installation in an indoor space through simple operation or erection and construction, so as to facilitate the construction of the aqua-farming facility and allows for diversified variations for different aqua-fanning needs. This is an aquaculture method that is a breakthrough for the conventional aqua-farming and is better fit the practical and economic needs for planned culture, and can be considered a great innovation of aquaculture technology.

In summary, the present invention provides a method of aquaculture, which applies scientific pressurization control to provide a water pressure inside a cultivation tank that is similar to deep water pressure, whereby simple adjustment can be done to provide the ecological conditions for culture of fishery products of different sea depths and simple practice of diversified aquaculture. In particular, the enclosed and pre-manufactured assembly of cultivation tank allow for simple management of indoor cultivation. For cultivation of fishery product, the present invention is a great innovation of dept sea fish farming and indoor cultivation, and is a complete new method for culture.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An apparatus for aquaculture comprising:
   a cultivation tank having an entry for deposition of fish therein, a pressure regulation valve, a liquid level control switch for controlling opening and closing of a water inlet port so as to maintain stable water level, a bait feeding opening at a top of said cultivation tank for installation of a closing valve for bait feeding control, said cultivation tank having a bottom provided with a recessed curved configuration in which a siphon tube is installed at a predetermined height for water draining and projects outside said cultivation tank and has an in-tank tube portion that forms a hollowed surface, a portion of said siphon tube extending outside said cultivation tank and connected with a first control valve which, after opened, establishes a negative pressure siphon effect through a high pressure inside said cultivation tank and a lower pressure outside said cultivation tank for sucking and discharging fish excrements settled on a bottom of said cultivation tank with draining water flow thereby ensuring fresh and stable water quality inside said cultivation tank;
   a high pressure air compressor for supplying pressurized air to an air storage tank which is processed by a water filter for water filtration and a drier for removing water and oil contained in said pressurized air thereby providing purified pressurized air which is then connected to said pressure regulation valve;
   a second control valve arranged outside said water inlet port and connected with a water inlet tube to supply purified and oxygenated water into said cultivation tank for circulation and replenishment of cultivation water,
   a wave generation device mounted at one side of an interior of said cultivation tank for forming waves in water contained in said cultivation tank;
   an aeration/separation tank connected with said cultivation tank, said aeration/separation tank having an upper half forming a natural aeration chamber so that when drained water discharged from said cultivation tank is sent into said upper half, said drained water is jetted into said cultivation tank through application of negative pressure to effect natural aeration and then flows through internally arranged multi-step cotton filter layers for preliminary purification/filtration that separates water and said excrements;
   a filtering/purification tank connected with said aeration/separation tank and having filtering materials in individual layers for purifying water from said aeration/separation tank;
   an ecological pond connected with said filtering/purification tank for carbon removal and filtration and purification for harmful substances of water discharged from said filtering/purification tank through an application of ecological process;
   a water storage tank for collecting water from said ecological pond and connected with a water pump for circulation and re-use so as to serve as replenishment for water for aquaculture.

2. The apparatus for aquaculture as claimed in claim 1, wherein said filtering materials comprise fine cotton filtration screen, sand, and fine aggregates that are arranged in individual layers.

3. The apparatus for aquaculture as claimed in claim 1, wherein said ecological pond comprises seaweeds for filtration and purification through a carbon removal ecological process.

* * * * *